June 14, 1966 W. JACKSON, JR 3,256,427

FACILITY LOCATION COMPUTER

Filed March 15, 1962 4 Sheets-Sheet 1

INVENTOR.
WARREN JACKSON JR.
BY
Schramm, Kramer & Sturges
ATTORNEYS.

INVENTOR.
WARREN JACKSON JR.

BY
Schramm, Kramer & Sturges

ATTORNEYS.

INVENTOR.
WARREN JACKSON JR.
BY
Schramm, Kramer & Sturges
ATTORNEYS

June 14, 1966 W. JACKSON, JR 3,256,427

FACILITY LOCATION COMPUTER

Filed March 15, 1962 4 Sheets-Sheet 4

INVENTOR.
WARREN JACKSON JR.
BY
Schramm, Kramer & Sturges
ATTORNEYS.

United States Patent Office 3,256,427

Patented June 14, 1966

3,256,427

FACILITY LOCATION COMPUTER

Warren Jackson, Jr., Lyndhurst, Ohio, assignor to The Standard Oil Company, Cleveland, Ohio, a corporation of Ohio Filed Mar. 15, 1962, Ser. No. 179,858
7 Claims. (Cl. 235—184)

This invention relates to computers, especially analog computers.

One of the problems which has been difficult to program on a general purpose analog computer is warehouse locations to minimize transportation costs, particularly where the problem involves a large number of different fixed destinations of goods and a plurality of fixed sources of supply. Moreover, routine programming of such a problem on a general purpose analog computer would call for such a large number of elements and multiplier units that straight forward programming could not be used because of hardware limitation.

In accordance with the invention, therefore, a special purpose computer was devised eliminating the need for variable multipliers. The computer in accordance with the invention provides a simulation which has application also in other location problems such as locating pipe line and marketing terminals in bulk distribution studies. The technique is applicable also to processing and manufacturing problems such as locating refinery equipment to minimize piping costs or the location of telephone central offices to minimize cable costs.

In providing an optimum facility location simulator, means are provided for producing signals proportional to the distance between a facility such as a proposed warehouse location and each of a plurality of different fixed destinations and means are provided for producing a plurality of signals proportional to the distance between a proposed facility location and each of different fixed locations of supply sources. Means are provided for weighting each of such signals in accordance with shipping-cost factors and all of the signals are summed to produce a resultant representative of total costs for shipping supplies and finished products for the proposed warehouse location. By shifting a pair of dials tentative different locations of warehouses are set into the computer; and by observation of the output an indication is quickly obtained of the most economical location.

A better understanding of the invention will be afforded by the following detailed description considered in conjunction with the accompanying drawing, in which.

Like reference characters are utilized throughout the drawing to designate like parts.

The apparatus illustrated is a special purpose analog computer which permits one to change the location of a warehouse by turning $x$ and $y$ warehouse co-ordinate dials. At the same time, by observing the total transportation costs for delivery from fixed sources and to fixed destinations one can choose those location co-ordinates which minimize the displayed transportation costs. One can also find the locus of warehouse locations which will cause a specified transportation cost, thus enabling one to plot quickly contours of constant transportation costs. The computer continuously calculates the absolute value of the distances from the variable co-ordinate points (warehouses) to fixed points (sources and destination), multiplies each by a constant and sums all these products (total transportation costs). No $x$–$y$ multipliers are used in the computer. This is a useful departure from standard analog computer techniques.

For a single warehouse location the problem solution is the warehouse co-ordinate $x_1, y_1$, which minimized costs, C, as represented by the following relationship:

$$C^*=\underset{x_1,\, y_1}{\text{MIN.}}\left\{\sum_i K_i^D[(X_i^D-x_1)^2+(Y_i^D-y_1)^2]^{1/2}+\sum_i K\alpha_i[(X_i^S-x_1)^2+(Y_i^S-y_1)^2]^{1/2}\right\}$$

For any given problem the warehouse location co-ordinates, $x_1, y_1$, are the independent variables. The total cost C is the dependent variable. $C^*$ is the minimum possible value of C and the values of the co-ordinates, $x_1, y_1$, which correspond to $C^*$ are the solution to the problem. The quantities $X_i^D$, $Y_i^D$ are the co-ordinates of fixed destinations in the problem, and $X_i^S$, $Y_i^S$ are the co-ordinates for the fixed sources of goods in the problem. The coefficients $K_i^D$ are fixed load or cost factors for the $i$ destinations and the coefficients $\alpha_i$ are fractions of the system load supplied by the $i$ sources of goods. K is the total load supplied to the destinations from the warehouse (or cost of supplying).

In carrying out the invention, the "$x$" co-ordinates are derived from a sinusoidal reference voltage and "$y$" co-ordinates from a cosinusoidal voltage. Since these reference voltages are orthogonal, they can be used to represent the rectangular co-ordinates of various geographical locations. The difference between the "$x$" co-ordinates of two points is the $x$ component of the required distance and similarly for the $y$ component. Addition of these two components produces a phase shifted sinusoidal voltage in which the scalar distance information is contained in the magnitude and the directional information is contained in the phase angle. If this sinusoidal voltage is then rectified and filtered, the phase information is destroyed and a D.-C. voltage is produced which is equal to the magnitude of the sinusoidal and which has a polarity determined only by the circuit configuration.

Figure 1:
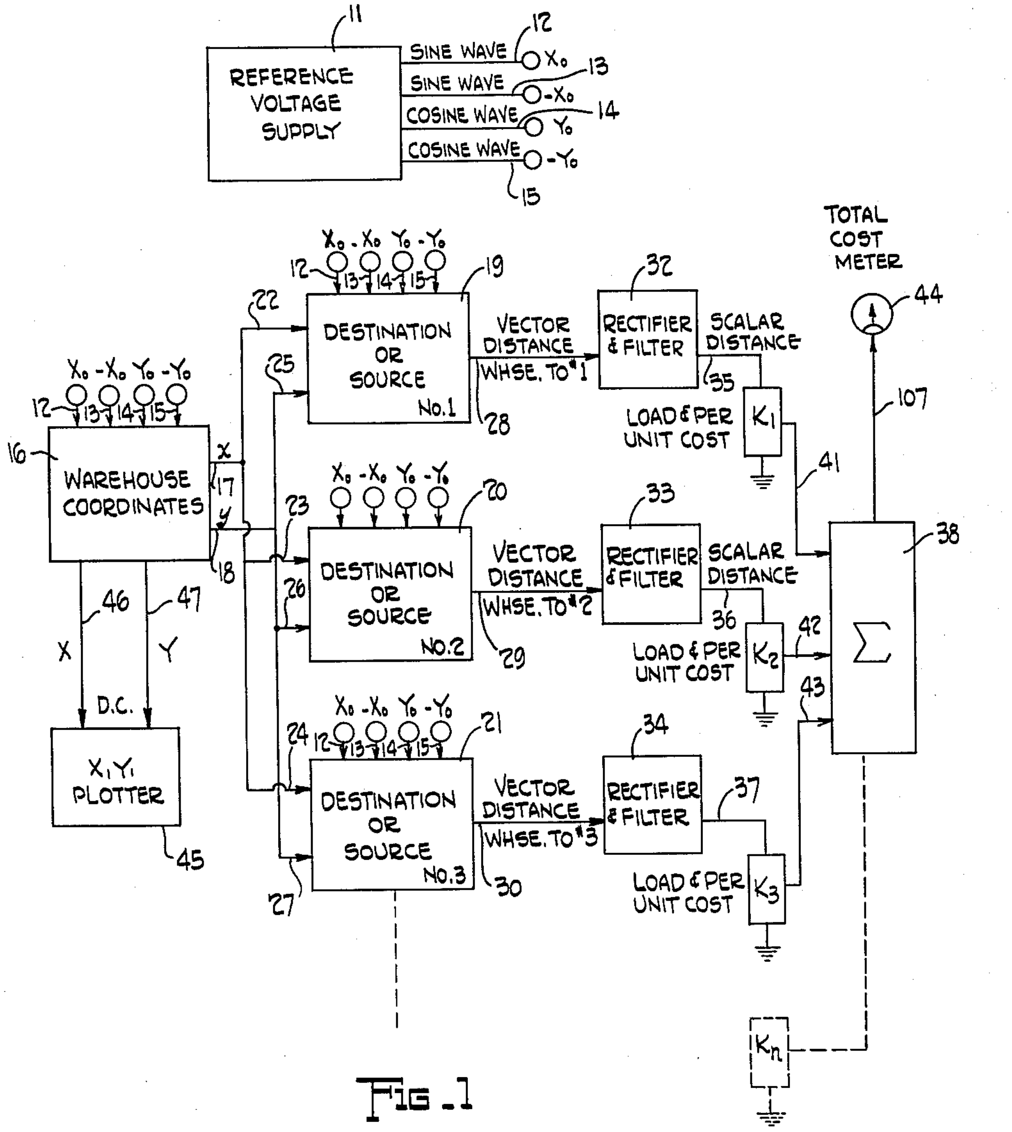
FIG. 1 is a block diagram of the overall computation arrangement.

The system illustrated in FIG. 1 comprises a reference voltage supply 11 with output connections 12, 13, 14 and 15 for producing positive and negative polarity sine and cosine waves. A positive sine wave $x_0$ appears at connection 12, a negative sine wave $-x_0$ appears at connection 13, a positive cosine wave $y_0$ appears at connection 14, and a negative cosine wave $-y_0$ appears at connection 15.

A plurality of resolvers are employed for combining the sine and cosine waves in appropriate polarities and with the appropriate coefficients to simulate the computation desired. There is a warehouse co-ordinate simulator 16 with output connections 17 and 18 for supplying weighted alternating-current voltages $x$ and $y$ derived from the input waves $x_0$, $-x_0$, $y_0$, and $-y_0$. The output connections 12, 13, 14 and 15 of the reference supply 11 are also input connections for the warehouse co-ordinate simulator 16. The same connections are applied also to destination or source resolvers 19, 20, 21 and any additional destination or source resolvers. Only three are shown for simplicity in the drawing, but it will be understood that any number of such simulators may be employed according to the number of destinations and sources involved in the problems to be solved. For simplicity in the drawing also the connections 12, 13, 14 and 15 are broken and are not shown in their continuity but represented merely by the output terminals of the supply 11 and the input terminals of the resolvers 16, 19, 20 and 21.

The destination or source simulators 19, 20 and 21 are provided with sine input connections 22, 23 and 24. The input connections 22, 23 and 24 of the destination or source units 19, 20 and 21 are connected in parallel to the sine or $x$ output connection 17 of the warehouse co-ordinate unit 16.

The destination or source elements 19, 20 and 21 also have cosine input terminals 25, 26 and 27, respectively, connected to the cosine or $y$ output connection 18 of the warehouse co-ordinate unit 16.

As will be explained more in detail hereinafter, the units 19, 20 and 21 are arranged to provide alternating-voltage outputs which are the resultants of the inputs from the pairs of terminals 22–25, 23–26, and 24–27, respectively, through output connections 28, 29 and 30, respectively. The outputs at the connections 28, 29 and 30 represent vector distances. Rectifier-filter units 32, 33 and 34 are connected to the output connections 28, 29 and 30 of the units 19, 20 and 21, respectively, in order to provide direct-current voltages at output connections 35, 36 and 37, respectively, representing scalar distances.

Units $K_1$, $K_2$ and $K_3$, respectively, are connected to the output lines 35, 36 and 37 for introducing coefficients representing unit shipping costs or other appropriate factors. Additional such units represented by the dash line figure $K_n$ are provided for introducing the appropriate factors in additional destination or source circuits (omitted from the drawing for simplicity).

A summation device 38, connected to the units $K_1$, $K_2$ and $K_3$ through lines 41, 42 and 43, respectively, is provided for producing voltage or current representative of total cost measured by direct-current instrument 44.

In order that a locus of warehouse locations of a preselected total cost may be drawn easily, an $x$–$y$ plotter 45 is provided having direct-current input connections 46 and 47 at which direct voltages X and Y are supplied from the warehouse co-ordinate unit 16.

Figure 2:
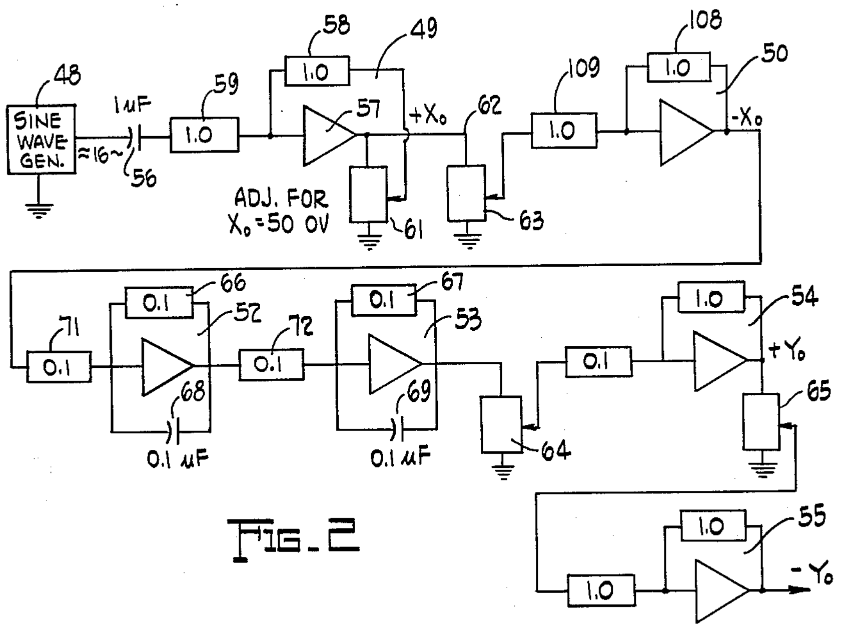
FIG. 2 is a block diagram of sine and cosine wave reference supply.

The reference voltage supply 11 produces positive and negative sine and cosine waves of fixed voltage peak amplitude for use as reference voltages. For example, the peak voltage may be 50 volts. To produce such voltages a sine wave generator 48 as shown in FIG. 2 is provided producing a signal of a given voltage, for example, 10 to 15 volts at a suitable frequency, for example, about 16 cycles per second. For producing the outputs of the desired peak voltage, amplifiers and phase shifters are provided. These include operational amplifiers 49 and 50 for producing the positive and negative sine waves, respectively, two 45° phase shifter stages 52 and 53 for producing a cosine wave, an operational amplifier 54 for producing the positive cosine wave and an additional operational amplifier stage 55 for producing the negative cosine wave. A coupling condenser 56 is provided for coupling the sine wave generator 48 to the operational amplifier 49.

The operational amplifier 49 may be of the type described and illustrated by Korn & Korn: Electronic Analog Computers, at pages 12 and 13 (2nd edition, 1956) or described by Soroka: (Analog Methods in Computation and Simulation, page 44 (1954), or similar to the operational amplifier units of the D.-C. analog computer "EASE" manufactured by the Richmond, California, Division of Beckman Instruments Company. This includes an odd number of stages 57 of wide-band, high-gain amplifiers so as to produce a 180° phase shift. There is a feedback resistor 58 and an input resistor 59 having an impedance, for example, one megohm. The feedback stage includes a potentiometer 61 adjustable for producing the desired predetermined voltage, for example, 50.0 volts so that a sinusoidal wave of desired peak value such as 50 volts appears at the terminal 62.

As shown at page 14 of Korn & Korn: Electronic Analog Computers, when the gain of the amplifier is very high compared with unity the ratio between the output and input voltages of the amplifier is proportional to the ratio between the feedback resistance and the series input resistance of the operational amplifier. Accordingly, an operational amplifier such as amplifier 50 obeys the equation:

$$E_0 = -\frac{R_0}{R_1} E_1$$

Where $R_0$ an $R_1$ are the resistances of the resistors 108 and 109, respectively, the voltage $E_1$ is input voltage and $E_0$ is the output voltage. The amplifiers 50, 54 and 55 are similar in principle of operation.

Adjustment of peak output voltage is accomplished by means of potentiometers 61, 63, 64 and 65, respectively. The phase shifters 52 and 53 also constitute operational amplifiers similar in principle of operation to the amplifiers 49, 50, 54 and 55 except that the feedback circuits include capacitative reactance. As shown the feedback circuits consist of resistors 66 and 67 shunted by capacitors 68 and 69, respectively, of suitable value in each case to produce 45° phase shift. For example, the resistors 66 and 67 may be 0.1 megohm resistors and the capacitors 68 and 69 have capacities of 0.1 microfarad each. There are series input resistors 71 and 72 also of 0.1 megohm resistance. The exact 90° phase relationship between the sine and cosine outputs is adjusted by adjusting the frequency of the sine wave generator 48.

If desired, the exact quadrature relationship may be checked by setting the sine and cosine waves to exactly 50 volts by means of a volt meter and adding the sine and cosine waves to determine whether the resultant is exactly 70.7 volts. The frequency of approximately 16 cycles per second was chosen as a compromise between speed (and ease of filtering) on the one hand and computational accuracy on the other hand.

Figure 3:
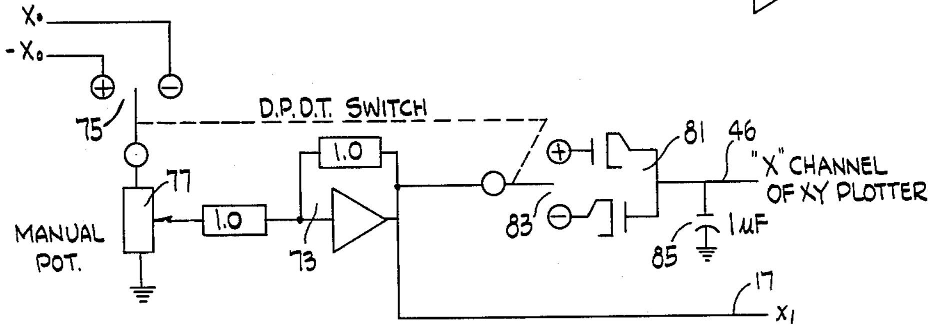
FIG. 3 is a block diagram of the $x$ channel of warehouse co-ordinate section.
Figure 4:
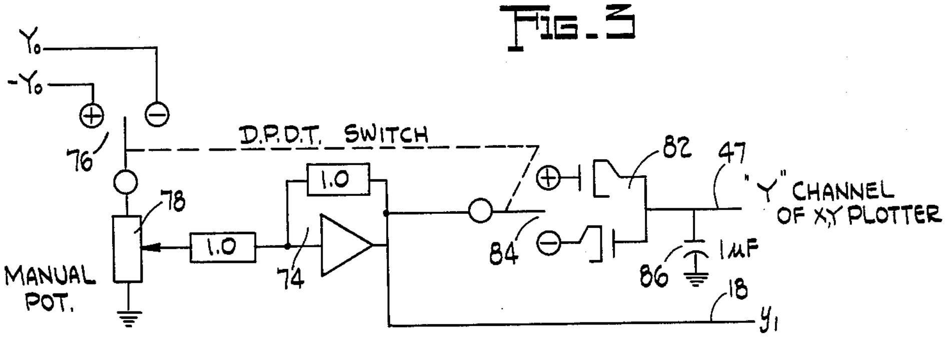
FIG. 4 is a block diagram of the $y$ channel of warehouse co-ordinate section.

The internal circuits of the warehouse co-ordinates section 16 are illustrated in FIGS. 3 and 4. For $x$ and $y$ co-ordinates, respectively, there are operational amplifiers 73 and 74 similar in principle of operation to the operational amplifier 50. For the $x$ co-ordinate a double throw switch 75 is provided in order that positive or negative sine wave may be applied to the operational amplifier 73 according to whether the proposed location of the warehouse is east or west of a datum line, that is, according to whether the $x$ co-ordinate is plus or minus. The double throw switch 76 correspondingly is set according to whether the $y$ co-ordinate is plus or minus or the warehouse is north or south of a datum line. The numerical values of co-ordinates, that is, the number of miles of the proposed warehouse location from each of the datum lines is set by means of manual potentiometers 77 and 78. Accordingly, alternating voltages $x_1$ and $y_1$ appear at output connections 17 and 18 representing the co-ordinates of a proposed warehouse location set in by the adjustment of the potentiometers 77 and 78.

For the actuation of the $x$–$y$ plotter 45 utilizing direct currents, rectifier units 81 and 82 are provided together with double throw switches 83 and 84 mechanically coupled to the switches 75 and 76 so as to form double-pole, double-throw switches. Each of the rectifier units 81 and 82 includes a pair of oppositely poled rectifiers so that the polarity of the direct-current signal appearing at the direct-current output lines 46 and 47 will correspond to the phase of the alternating-current signal at connections 17 and 18. Smoothing condensers 85 and 86 may be provided. The $x$–$y$ plotter 45 may be of any suitable type for moving a pen in transverse directions over a chart in proportion to magnitudes of two voltages X and Y. It is assumed to operate on direct current in the embodiment illustrated.

Figure 5:
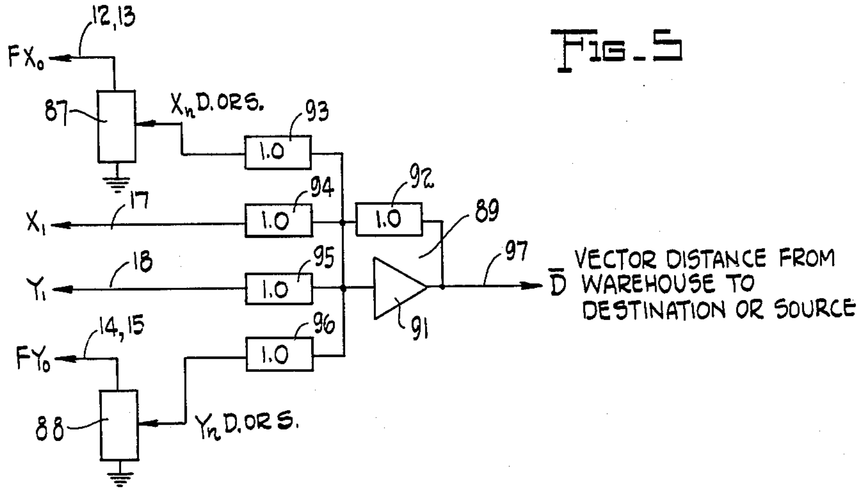
FIG. 5 is a block diagram of the source or destination section.

Each of the source or destination sections such as 19, 20 and 21 contains similar potentiometers or fixed volt-divider resistors of selected value for setting source or destination co-ordinates. In the case of sources or destinations, the co-ordinates are fixed for any given problem so the switches are omitted and the proper reference voltages are connected manually. The internal connections of one of the source or destination sections are illustrated in FIG. 5. The connections are set as to subtract the *x* and *y* co-ordinates of the destination or source from those of the warehouse.

Potentiometers 87 and 88 are provided for setting in the *x* and *y* co-ordinates of the destination or source. There is an operational amplifier 89 including a wide-band, high-gain inverter amplifier 91 having odd number of stages with a feedback impedance 92 and parallel input impedances 93, 94, 95 and 96 connected respectively to the potentiometer 87, the *x* output line 17 from the warehouse co-ordinate section 16, the *y* co-ordinate line 18 from the warehouse co-ordinate section 16, and the potentiometer 88. The voltage output at the line 97 accordingly represents the vector distance from the warehouse to one of the destinations or sources in question.

Figure 6:
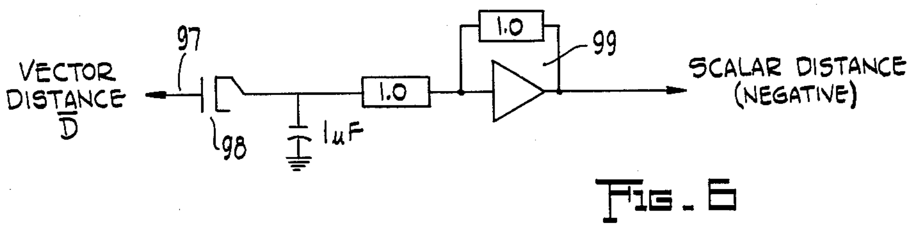
FIG. 6 is a block diagram of the rectifier and filter section of the computer.

In order to convert the vector distance representation alternating voltage into a direct voltage representing scalar distance, a rectifier filter unit such as the units 32, 33 and 34 is employed, the internal circuits of any of which is illustrated in FIG. 6. The circuit includes a diode 98, such as a silicon diode, connecting the output line 97 from the destination or source unit such as the unit 19 to an operational amplifier 99 of the type described in connection with the unit 50.

Figure 7:
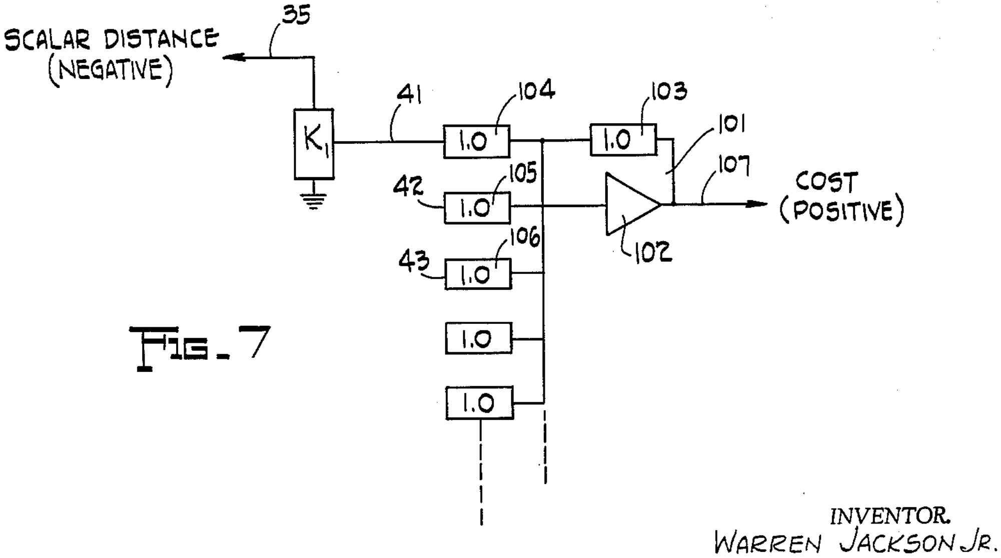
FIG. 7 is a block diagram of the load factor and cost summation section.

The internal circuits of the summation unit 38 are illustrated in FIG. 7. The operational amplifier 101 includes an odd number of stages of high-gain, wide-band amplifiers 102 with a feedback resistor 103 and a plurality of input resistors 104, 105 and 106 corresponding to the destination or source units 19, 20 and 21 together with additional input resistors from additional destination or source units not shown in FIG. 1. Cost factor potentiometer units such as the units $K_1$, $K_2$ and $K_3$ of FIG. 1 are interposed ahead of the respective input resistors 104, 105 and 106, respectively, a portion of the circuit being omitted in FIG. 7 for the sake of simplicity in the drawing. The potentiometers $K_1$, $K_2$ and $K_3$, etc. are each set at a value representing the product of unit shipping cost and fraction of load for the source or destination in question.

Since the cost for shipment between the warehouse and each destination or source in question is a scalar quantity, the total costs are obtained by arithmetic addition of direct current quantities all of which are of the same polarity or positive voltages for actuating the total cost meter 44 through a conductor 107. As already explained, the individual source or destination load factors represented by $K_1$–$K_n$ are applied to their respective distances to obtain the components of the total cost and then these components are summed to produce a voltage representing the total cost in units which will depend upon the units of the $K_1$–$K_n$ factors. The total cost meter 44 may take the form of a display panel. The total cost is then displayed upon the panel meter 44 which is observed while adjusting the manual potentiometers 77 and 78 representing the warehouse location. In this manner a minimum cost is found very quickly, usually less than a fraction of a minute by manual manipulation.

Figure 8:
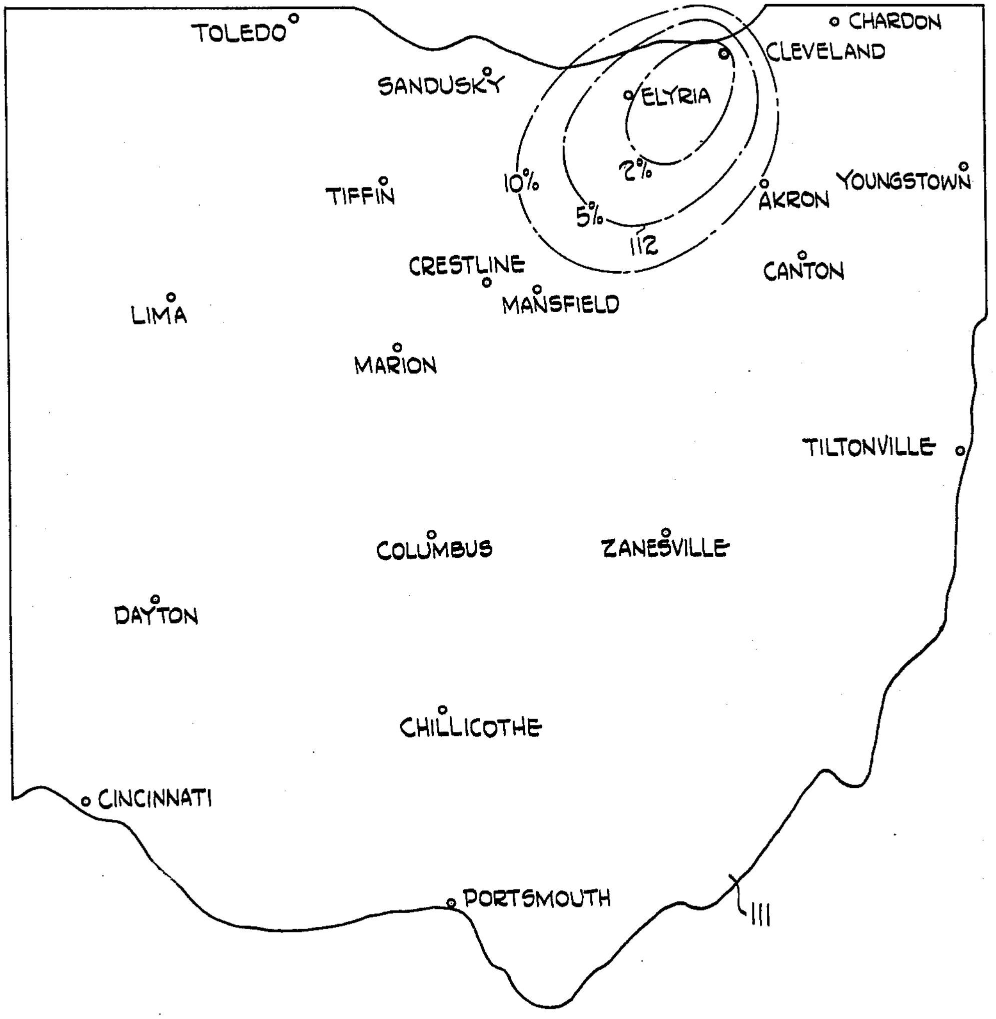
FIG. 8 is a map illustrating a locus of warehouse locations for different degrees of deviation from minimum costs.

The location of the warehouse as determined by the manual potentiometers is conveniently "read out" by the *x–y* plotter 45 in the form of ink marks on a previously prepared map such as the map 111 shown in FIG. 8. The apparatus also permits the plotting of constant cost contours on the map. The *x* and *y* co-ordinates of the warehouse are adjusted until a particular cost (say 5% higher than the optimum) is read on the meter. Then a locus 112 of all such points forms a constant cost contour.

Although the simulation has been described as utilized for the purpose of locating the most economical location of a warehouse for goods to be shipped to a given destination made up from parts derived from a plurality of different supply sources or to a plurality of destinations from a given supply location, the technique is applicable also to other facility locations such as locating refinery equipment to minimize piping costs, locating telephone central offices to minimize cable costs, locating steam generators or other process machines and similar problems.

In accordance with the provisions of the patent statutes, the principle of operation of the invention has been described together with the apparatus now believed to represent the best embodiment thereof, but it is to be understood that the apparatus shown and described is only illustrative and that the invention may be carried out by other arrangements.

What is claimed is:

1. An optimum facility location computer comprising in combination means for simultaneously producing a signal for each of a plurality of different fixed destinations proportional to the distance between a proposed facility location and a fixed destination, means for weighting each of said signals according to the fraction of the goods for each of such fixed destinations, means for simultaneously producing a signal for each of a plurality of different locations of supply sources proportional to the distance between a proposed facility location and a fixed location of supply source, means for weighting each of said signals in accordance with the fraction of the supplies to be taken from each of said sources, and means for vectorially adding all of said signals in order to produce a resultant electrical signal representative of total costs of shipping supplies and goods for the proposed facility location.

2. An optimum facility location computer comprising in combination a reference voltage supply of first and second waves in quadrature, means for producing a plurality of sine and cosine signals from said waves and proportioning them to co-ordinates, said signals including sine and cosine signals proportional to the co-ordinates of a warehouse, the sine singal being generated by the first wave and proportional to one of the co-ordinates, the cosine signal being generated by the second wave and proportional to a co-ordinate perpendicular to the first co-ordinate in a system of rectilinear co-ordinates, said signals including also coresponding sine and cosine signals proportional to the co-ordinates of a destination, means for producing a resultant of the cosine signals and sine signals, a plurality of means for producing pairs of corresponding sine and cosine signals proportional to supply source distances, means for combining each of the source sine wave and cosine wave signals with the warehouse co-ordinate sine and cosine wave signals, respectively and producing separate resultants, means for multiplying each of the resultants by a load and per unit cost factor, and means for adding the resultant signals to produce a signal representing total cost.

3. An optimum facility location computer comprising in combination a reference voltage supply of first and second waves in quadrature, means for producing a plurality of sine and cosine signals from such waves and proportioning the signals to co-ordinates, said signals including sine and cosine signals proportional to the co-ordinates of a warehouse, the sine signal being generated by the first wave and proportional to one of the co-ordinates, the cosine signal being generated by the second wave and proportional to a co-ordinate perpendicular to the first in a system of rectilinear co-ordinants, said signal including also sine and cosine signals proportional to the co-ordinates of a distination, means for producing a resultant of cosine signals and sine signals, means for producing sine and cosine signals proportional to the co-ordinates of a supply source, means for combining the source sine wave and cosine wave signals with the warehouse co-ordinate sine and cosine wave signals respectively, and producing separate resultants, means for converting the resultants to scalar values and means for adding the scalar values.

4. Apparatus as in claim 3 including means for multiplying the scalar values by a unit cost factor whereby the sum of the scalar signals represents total cost.

5. In a computer, a sine wave generator, means for obtaining a cosine wave from said generator, means for adjusting the frequency of the generator to adjust the precision of quadrature relation between the sine and cosine waves, means for adjusting the peak value of the sine and cosine waves, means for applying multiplying factors in different circuits to the sine wave and to the cosine wave to represent different quantities to be included in a computation, thereby producing a plurality of sine waves and a plurality of cosine waves, means for combining sine and cosine waves to obtain vector sums, and means for rectifying and adding the combined waves to obtain a scalar total.

6. In a computer for handling vector quantities, a source of sine and cosine waves of fixed amplitude, potentiometers energized by said waves to produce quadrature alternating voltages, said potentiometers having taps to produce signals representative of rectilinear co-ordinants of a quantity, the taps being set to provide the desired magnitude of each co-ordinate, and additional potentiometers with taps for producing additional quadrature alternating current signals from the sine and cosine waves to represent the co-ordinates of another vector quantity and means for combining the co-ordinate signals from all the taps in order to produce a vector resultant.

7. Apparatus as in claim 6 wherein the combining means is provided with a rectifier for producing a scalar output.

References Cited by the Examiner

UNITED STATES PATENTS

| | | | |
|---|---|---|---|
| 2,873,066 | 2/1959 | McKenney | 235—189 |
| 2,980,332 | 4/1961 | Brouillette | 235—197 |
| 2,991,469 | 7/1961 | McCurdy | 331—45 |

MALCOLM A. MORRISON, *Primary Examiner.*

K. W. DOBYNS, *Assistant Examiner.*